US008099495B2

(12) United States Patent
Sood et al.

(10) Patent No.: US 8,099,495 B2
(45) Date of Patent: *Jan. 17, 2012

(54) METHOD, APPARATUS AND SYSTEM FOR PLATFORM IDENTITY BINDING IN A NETWORK NODE

(75) Inventors: Kapil Sood, Beaverton, OR (US); Jesse R. Walker, Portland, OR (US)

(73) Assignee: Intel Corporation, Santa Clara, CA (US)

(*) Notice: Subject to any disclaimer, the term of this patent is extended or adjusted under 35 U.S.C. 154(b) by 918 days.

This patent is subject to a terminal disclaimer.

(21) Appl. No.: 11/323,333

(22) Filed: Dec. 29, 2005

(65) Prior Publication Data

US 2007/0156858 A1 Jul. 5, 2007

(51) Int. Cl.
- G06F 15/173 (2006.01)
- G06F 15/16 (2006.01)
- G06F 15/177 (2006.01)
- G06F 9/00 (2006.01)
- G06F 9/24 (2006.01)
- G06F 7/04 (2006.01)
- G06F 17/30 (2006.01)
- H04L 29/06 (2006.01)

(52) U.S. Cl. ........ 709/225; 709/217; 709/220; 709/221; 709/223; 709/229; 713/1; 713/2; 726/2; 726/3; 726/4

(58) Field of Classification Search .................. 709/225, 709/229, 217, 220–221, 223; 713/1–2; 726/2–4
See application file for complete search history.

(56) References Cited

U.S. PATENT DOCUMENTS

| 5,590,285 | A  | * | 12/1996 | Krause et al. ................. 709/218 |
|-----------|-----|---|---------|---------------------------------------|
| 6,920,558 | B2 |   | 7/2005  | Sames et al. |
| 7,512,970 | B2 |   | 3/2009  | Naftali et al. |
| 7,536,464 | B1 | * | 5/2009  | Dommety et al. ............ 709/228 |
| 7,587,751 | B2 |   | 9/2009  | Potter et al. |
| 2002/0095514 | A1 | * | 7/2002 | Cromer et al. ................ 709/245 |
| 2002/0129264 | A1 | * | 9/2002 | Rowland et al. ............. 713/200 |
| 2002/0129274 | A1 | * | 9/2002 | Baskey et al. ................ 713/201 |
| 2002/0138726 | A1 |   | 9/2002 | Sames et al. |
| 2002/0146980 | A1 | * | 10/2002 | Solondz et al. ................ 455/21 |
| 2004/0088369 | A1 | * | 5/2004 | Yeager et al. ................ 709/217 |
| 2004/0107360 | A1 | * | 6/2004 | Herrmann et al. ........... 713/201 |
| 2004/0177248 | A1 | * | 9/2004 | Yoshida ........................ 713/155 |
| 2004/0179540 | A1 | * | 9/2004 | Lee et al. ...................... 370/401 |
| 2004/0179684 | A1 | * | 9/2004 | Appenzeller et al. .......... 380/44 |
| 2004/0268140 | A1 | * | 12/2004 | Zimmer et al. .............. 713/200 |
| 2005/0050363 | A1 | * | 3/2005 | Naka et al. ................... 713/201 |
| 2005/0228874 | A1 | * | 10/2005 | Edgett et al. ................. 709/220 |
| 2006/0015724 | A1 |   | 1/2006 | Naftali et al. |
| 2006/0026670 | A1 |   | 2/2006 | Potter et al. |
| 2006/0026671 | A1 |   | 2/2006 | Potter et al. |

(Continued)

OTHER PUBLICATIONS

DeLiberato, Daniel, et al., "Intel and Cisco Collaborate to Improve Enterprise Security," Technology@Intel Magazine, Sep. 2005, pp. 1-8.

(Continued)

*Primary Examiner* — Ashok Patel
*Assistant Examiner* — Kevin Bechtel
(74) *Attorney, Agent, or Firm* — Schwabe, Williamson & Wyatt, P.C.

(57) ABSTRACT

Embodiments of apparatuses, articles, methods, and systems for binding various platform identities for a policy negotiation are generally described herein. Other embodiments may be described and claimed.

23 Claims, 4 Drawing Sheets

U.S. PATENT DOCUMENTS

| | | | |
|---|---|---|---|
| 2006/0136717 A1* | 6/2006 | Buer et al. | 713/155 |
| 2006/0143292 A1* | 6/2006 | Taubenheim et al. | 709/225 |
| 2006/0150250 A1* | 7/2006 | Lee et al. | 726/23 |
| 2006/0156391 A1 | 7/2006 | Salowey | |
| 2006/0236127 A1* | 10/2006 | Kurien et al. | 713/193 |
| 2007/0016801 A1* | 1/2007 | Bade et al. | 713/193 |
| 2007/0208937 A1 | 9/2007 | Cam-Winget et al. | |
| 2008/0005359 A1 | 1/2008 | Khosravi et al. | |

OTHER PUBLICATIONS

Office Action for U.S. Appl. No. 11/393,486, mailed Dec. 10, 2009, 11 pages.

Ken Grewal, 802.1 AE/AF Platform Considerations, Nov. 2004, IEEE 802.1 Plenary, 16 pages.

Final Office Action for U.S. Appl. No. 11/393,486, mailed Jun. 21, 2010, 9 pages.

* cited by examiner

100

METHOD, APPARATUS AND SYSTEM FOR PLATFORM IDENTITY BINDING IN A NETWORK NODE

FIELD

Embodiments of the present invention relate generally to the field of networks, and more particularly to binding a plurality of platform identities on a node to be used in such networks.

BACKGROUND

Wireless networks are proliferating at a rapid pace as computer users become increasingly mobile. Wireless networks offer users significant flexibility to "roam" across networks without being tied to a specific location. This roaming must be managed by a variety of management solutions. One downside of wireless networks, however, is that they typically face significant security issues. Since the connection is "wireless," i.e., not physical, and connects to different administrative domains, any party with a compatible wireless network interface may position themselves to inspect and/or intercept wireless packets. In other words, any third-party hacker or attacker may, with relative ease, gain access to packets being transmitted across a wireless network, regardless of who the packets are actually destined for. Employment of security measures to control access to a network may help secure the network; however, administration may be complicated by an increasing amount of entities requesting access.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of the present invention may provide a method, apparatus, and system for enabling a secure wireless platform. More specifically, embodiments of the present invention may provide a network node capable of binding a plurality of platform identities in negotiation of an access policy to the network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

The phrase "A and/or B" means "(A), (B), or (A and B)."

The phrase "at least one of A, B and C" means "(A), (B), (C), (A and B), (A and C), (B and C) or (A, B and C)."

Figure 1:
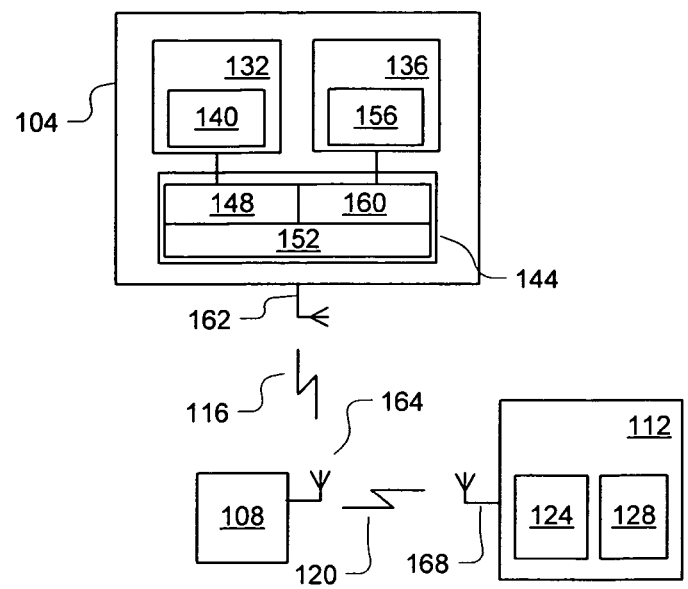
FIG. 1 illustrates a network in accordance with an embodiment of the present invention.

FIG. 1 illustrates a network 100 having network nodes 104, 108, and 112 communicatively coupled to one another via communication links such as over-the-air links 116 and 120 as shown in accordance with an embodiment of the present invention. The over-the-air links 116 and 120 may be a range of frequencies within the radio spectrum, or a subset therein, designated for wireless communication between the nodes of the network 100. In other embodiments, communication links may additionally/alternatively include wired links.

In discussion of the present embodiment the node 104 may also be referred to as end node 104, the node 108 may also be referred to as a network access device (NAD) 108, and the node 112 may also be referred to as authentication node 112. However, in various embodiments, the nodes 104, 108, and 112 may be any type of device that is capable of communicating with other devices over the network 100. Generally such devices may include personal computers, servers, access points, laptops, portable handheld computers (e.g., personal digital assistants or "PDAs"), set-top boxes, intelligent appliances, wireless telephones, web tablets, wireless headsets, pagers, instant massaging devices, digital cameras, digital audio receivers, televisions and/or other devices that may receive and/or transmit information wirelessly (including hybrids and/or combinations of the aforementioned devices).

The NAD 108 may serve as an entry point to provide the end node 104 with access to other nodes of the network 100, including node 112 as well as other devices not specifically shown. The NAD 108 may be a stand-alone device and/or be incorporated as part of another network device such as a network bridge, router, or switch.

At a network entry event, e.g., a power-on event or an event signifying end node 104 has come within the transmission/reception range of NAD 108, the end node 104 may engage in a negotiation with the authentication node 112, through the NAD 108, that is designed to procure an access policy to control the end node 104 access and/or participation with the network 100. This may sometimes be referred to as end-point access control and verification (EACV). This EACV may be used to facilitate, e.g., authenticated client access to an enterprise network. The authentication node 112 may include an authentication device 124 to provide preliminary authentication measures to verify aspects of communication from end node 104, and a policy decision point (PDP) device 128 to formulate and communicate a network access policy to the NAD 108 and/or the end node 104, to control network access of the end node 104. The authentication device 124 and the PDP 128 may be co-located in the same device or separate from one another.

The end node 104 may include a host partition 132, including an operating system (OS) and other components to provide various user functions. The end node 104 may also have a dedicated partition 136, which may operate independently from the operating system of the host partition 132, to provide various management functions. In an embodiment, the dedicated partition 136 may provide a network administrator access to the end node 104 regardless of the power state or OS condition. This ability to communicate with the end node 104 remotely may be called "out-of-band" (OOB) management to indicate that the channel may be OS-agnostic and always available.

The host partition 132 may include an upper layer 140, which may include the OS, coupled to a network interface, e.g., a wireless network interface card (WNIC) 144, to access the over-the-air link 116. More specifically, the upper layer 140 may be coupled to a media access control (MAC) layer 148 of the WNIC 144, which is in turn coupled to a physical (PHY) layer 152. Similarly, an upper layer 156 of the dedicated partition 136 may access the over-the-air link 116 through the MAC layer 160, of the WNIC 144, and the PHY layer 152. The PHY layer 152, which may refer to the physical layer in the Open Systems Interconnect (OSI) model, may provide the hardware for the end node 104 to send and receive data.

The MAC layers 148 and 160, which may be sublayers of the data link layer of the OSI model, may be responsible for transmitting data packets between the WNIC 144 and the upper layers 140 and 156, respectively. Each of the MAC layers 148 and 160 may provide framing, addressing, and/or medium accessing operations to facilitate data being transmitted to/from the respective upper layers 140 and 156.

In various embodiments, upper layers 140 and/or 156 may include one or more layers and/or sublayers of the OSI model including, a logical link control sublayer, a network layer, a transport layer, a session layer, a presentation layer, and/or an application layer.

While a node having multiple MAC layers may have certain advantages, it may also complicate management and procurement of network access permissions as the upper layers 140 and 156 may be working independently and potentially unaware of one another. The operation of the MAC layers 148 and 160 and/or the upper layers 140 and 156, may contribute to the existence of multiple identities on the platform. Other network entities, e.g., authentication node 112, may not realize the various identities are operating from a common platform. As used herein, "platform" may refer to the general framework of the end node 104 including, e.g., the various hardware, software, and/or firmware configurations, some of which are to be described in further detail below.

Therefore, in accordance with an embodiment of the present invention, the dedicated partition 136 may provide an independent and secure environment to bind the various identities of the end node 104 to one another. With the platform identities bound to one another, the dedicated partition 136 may perform various platform policy negotiations with the authentication node 112 in order to procure a platform policy for network access. As used herein, a platform policy may include one or more network access policies and/or filters, which may be applied to the entities of a platform, or a subset thereof. The platform policy may be applied through hardware and/or software components on the platform. Further details of these interactions are described in detail later in the specification.

While some embodiments of the present invention are discussed with two MAC layers, other embodiments may have less or more MAC layers.

Although FIG. 1 illustrates two partitions, host partition 132 and dedicated partition 136, other embodiments may have any number of partitions including, e.g., a dedicated partition and a plurality of host partitions.

In various embodiments, the dedicated partition 136 may comprise a variety of different types of partitions, including an entirely separate hardware partition (e.g., utilizing Active Management Technologies (AMT), "Manageability Engine" (ME), Platform Resource Layer (PRL) and/or other comparable or similar technologies) and/or a virtualized partition (e.g., a virtual machine in a Virtualization Technology (VT) scheme). In various embodiments, a virtualized host may also be used to implement AMT, ME, and PRL technologies (as described in further detail below).

In this embodiment, the nodes 104, 108, and 112 may each have antennae structures 162, 164, and 168, respectively, to facilitate wireless transmission/reception of data. An antenna structure may provide a respective wireless network interface with communicative access to an over-the-air link. In various embodiments, each of the antenna structures 162, 164, and/or 168 may include one or more directional antennas, which radiate or receive primarily in one direction (e.g., for 120 degrees), cooperatively coupled to one another to provide substantially omnidirectional coverage; or one or more omnidirectional antennas, which radiate or receive equally well in all directions.

In various embodiments, the nodes 104, 108, and/or 112 may have one or more transmit and/or receive chains (e.g., a transmitter and/or a receiver and an antenna). For example, in various embodiments, nodes 104, 108, and/or 112 may be a single-input, single-output (SISO) node, a multiple-input, multiple-output (MIMO) node, single-input, multiple-output (SIMO), or multiple-input, single-output (MISO) node.

The network 100 may comply with a number of topologies, standards, and/or protocols. In one embodiment, various interactions of the network 100 may be governed by a standard such as one or more of the American National Standards Institute/Institute of Electrical and Electronics Engineers (ANSI/IEEE) standards (e.g., IEEE 802.1x-REV-2004, along with any updates, revisions, and/or amendments to such). In various embodiments, the network 100 may additionally or alternatively comply with other communication standards, e.g., other 802.1 standards, 802.11 standards, 802.16 standards, standards conforming to the 3G International Telecommunications Union (ITU) specification for mobile communications technology, etcetera.

In various embodiments, the network 100 may comprise any type of network architecture including, but not limited to, local area networks (LANs), wireless LANs (WLANs), wireless wide area networks (WWANs), wireless metropolitan area networks (WMANs) and/or corporate intranets.

Figure 2:
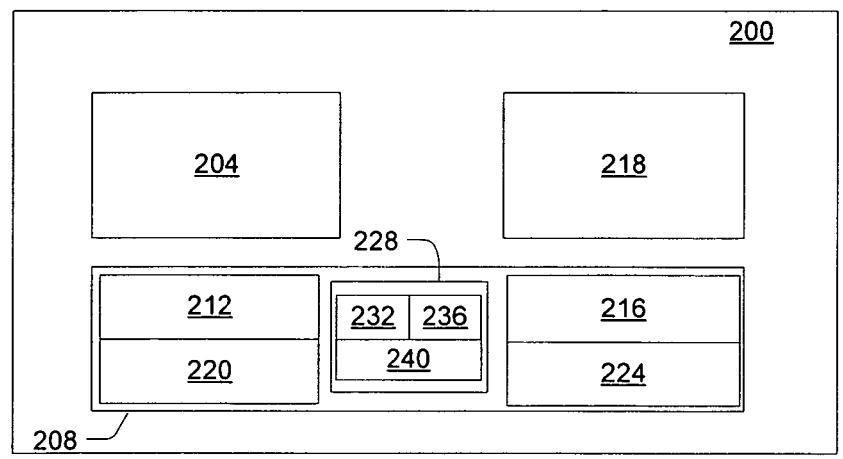
FIG. 2 illustrates an end node utilizing active management technology in accordance with an embodiment of the present invention.

FIG. 2 illustrates an end node 200 utilizing AMT in accordance with an embodiment of the present invention. The end node 200 may be similar to, and substantially interchangeable with, end node 104. Various embodiments of the present invention may also be implemented in other similar and/or comparable implementations of AMT. Only the components pertinent to describing the AMT environment have been illustrated in order not to unnecessarily obscure embodiments of the present invention, additional components may be included without departing from the spirit of embodiments of the invention.

Thus, as illustrated in FIG. 2, the end node 200 may include a host OS 204, running on a host partition, and system hardware 208. According to one embodiment, the hardware 208 may include two processors, a host processor 212 to perform processing tasks for host OS 204 and a dedicated processor 216 dedicated exclusively to managing the device via AMT 218 running on a dedicate partition. Each processor may have associated resources on the end node 200 and may share one or more other resources. Thus, as illustrated in this example, host processor 212 and dedicated processor 216 may each have portions of memory dedicated to them, e.g., host memory 220 and dedicated memory 224, respectively; portions of a NIC 228 dedicated to them, e.g., host MAC layer 232 and dedicated MAC layer 236, respectively; but they may share other portions of the NIC 228, e.g., PHY layer 240.

Figure 3:
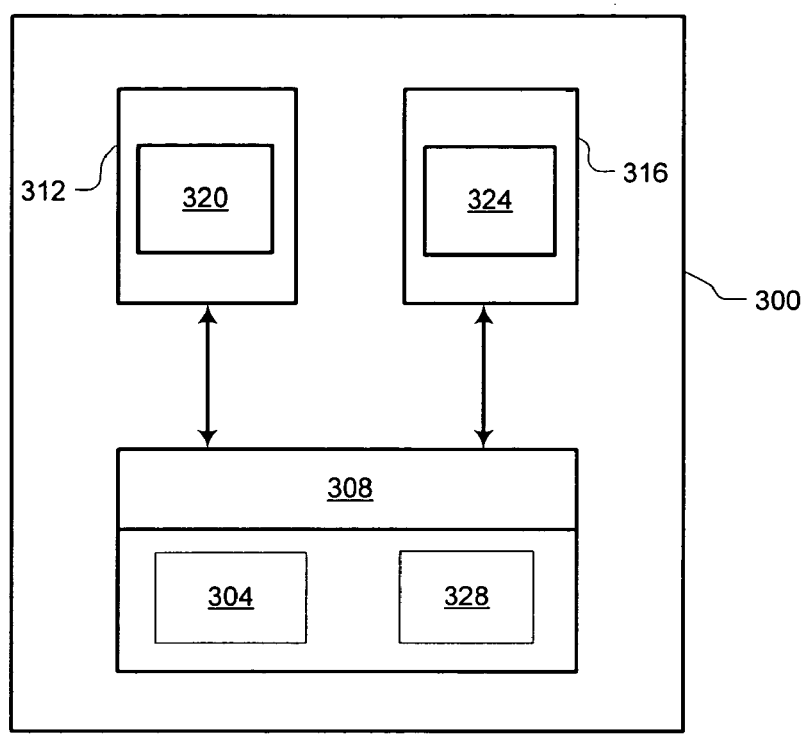
FIG. 3 illustrates an end node utilizing a virtualized active management technology in accordance with an embodiment of the present invention.

FIG. 3 illustrates an end node 300 utilizing virtualization in accordance with an embodiment of the present invention. The end node 300 may be similar to, and substantially interchangeable with, end node 104. It may include only a single processor 304 but a virtual machine monitor (VMM) 308 on the device may present multiple abstractions and/or views of the device, such that the underlying hardware of the node 300 appears as one or more independently operating virtual machines (VMs), e.g., host partition 312 and dedicated partition 316. VMM 308 may be implemented in software (e.g., as a stand-alone program and/or a component of a host operating system), hardware, firmware and/or any combination thereof. VMM 308 may manage allocation of resources on the node 300 and perform context switching as necessary to cycle between the host partition 312 and the dedicated partition 316 according to a round-robin or other predetermined scheme. Although only processor 304 is illustrated, embodiments of the present invention are not limited to only one processor. In various embodiments, multiple processors may also be utilized within a virtualized environment. For example, if the end node 300 includes two processors the dedicated partition 316 may be assigned a dedicated processor while the host partition 312 (and other host partition VMs) may share the resources of a host processor.

While the node 300 shows two VM partitions, host partition 312 and dedicated partition 316, other embodiments may employ any number of virtual machines. VMs may function as self-contained partitions respectively, running their own software hosted by VMM 308, illustrated as host software 320 and AMT software 324.

The host software 320 and AMT software 324 may each operate as if it were running on a dedicated computer rather than a virtual machine. That is, host software 320 and AMT software 324 may each expect to control various events and have access to hardware resources on node 300, e.g., a NIC 328.

A physical hardware partition with a dedicated processor (as illustrated in FIG. 2, for example) may provide a higher level of security than a virtualized partition (as illustrated in FIG. 3, for example), but embodiments of the invention may be practiced in either environment and/or a combination of these environments to provide varying levels of security. For the purposes of simplicity, embodiments of the invention are described in an AMT environment, but embodiments of the invention are not so limited. Instead, any reference to AMT, a "dedicated partition," a "secure partition," a "security partition," and/or a "management partition" shall include any physical and/or virtual partition (as described above).

Figure 4:
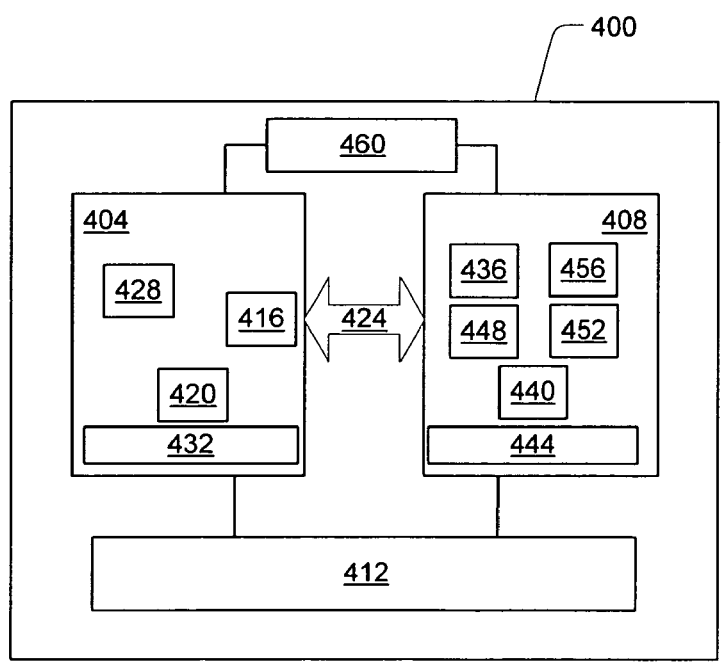
FIG. 4 illustrates an end node utilizing active management technology in accordance with another embodiment of the present invention.

FIG. 4 illustrates a node 400 in accordance with an embodiment of the present invention. The node 400 may be similar to, and substantially interchangeable with, the end node 104. The node 400 may include a host partition 404, a dedicated partition, e.g., AMT 408, and a NIC 412, which may be similar to like-named elements described above. The AMT 408 may be separated from the host partition 404, e.g., via physical separation, virtual separation, or a combination thereof, to enhance the security on the wireless platform.

The host partition 404 may include components such as an ME agent 416 to provide an ME of the AMT 408 with limited access and control of components of the host partition 404. Access to the ME agent 416 by the operating system of the host partition 404 may be restricted, wholly or in part. The ME agent 416, which may be limited to a network stack 420, may gather data on critical parameters about behavior and/or state of the host partition 404, may provide certain controls of the host partition 404, e.g., reboot, and/or may provide various security mechanisms. Interactions between the host partition 404 and the AMT 408 may take place over a dedicated channel 424 protected against forgery, eavesdropping, delayed messages, and/or replay attacks.

In some embodiments, the network stack 420, e.g., Transport Control Protocol (TCP), Internet Protocol (IP), User Dependent Protocol (UDP), and/or Dynamic Host Configuration Protocol (DHCP), may perform various routing, flow control, segmentation/desegmentation, and/or error control functions.

In some embodiments the host partition 404 may have an authenticator 428 complying with, e.g., an extensible authentication protocol (EAP) framework. The authenticator 428 may allow for authentication and/or key generation procedures with other entities, e.g., the NAD 108 and/or authentication node 112.

In some embodiments, the host partition 404 may also have a driver 432 that may be part of a link layer implementation within an OS, to facilitate communication between the components of the host partition 404 and the NIC 412.

As illustrated, the AMT 408 may include an authenticator 436, a network stack 440, and a driver 444, which may be similar to like-named components of the host partition 404. The AMT 408 may also include an end-point access control (EAC) trust agent 448 and a posture attestor 452 to facilitate collection and attesting of platform posture information. In some embodiments, the AMT 408 may also have a policy applicator 456 to facilitate application of a platform policy.

In an embodiment, the end node 400 may include a trusted platform module 460 coupled to the host partition 404 and the dedicated partition 408 for establishing a root of trust between the partitions.

Details of the interaction of the various components described above may be given below in accordance with some embodiments.

Figure 5:
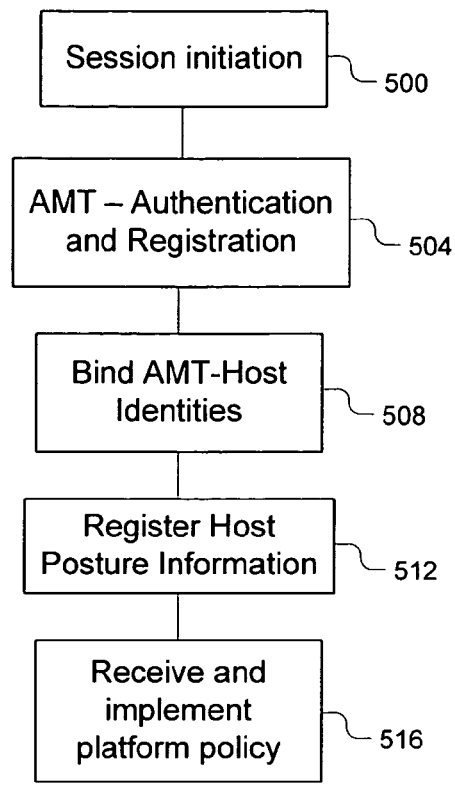
FIG. 5 illustrates a policy negotiation of an end node in accordance with an embodiment of the present invention.

FIG. 5 illustrates a policy negotiation of the end node 400 in accordance with an embodiment of the present invention. A platform policy negotiation may be initiated at the beginning of a communication session (500). Reference to operations depicted in FIG. 5 may be indicated by numerals enclosed in parentheses. The AMT 408 may access the over-the-air link 116 and perform registration and mutual authentication operations with the authentication node 112 via the NAD 108 (504). The trust agent 448 may collect posture information on the AMT 408 and transmit the collected posture information to the authentication node 112, via the NAD 108. Posture information may be information related to the state of the AMT 408 which may include, but is not limited to, basic input/output system (BIOS) revision level, firmware revision level, antivirus state, status, and/or configuration settings.

The AMT 408 may be deemed to be a compliant entity upon successful registration and mutual authentication and may therefore be validated by the authentication node 112. Upon validation, the AMT 408 may cooperate with the authentication node 112 to effectively bind the host partition 404 to the AMT 408 (508). In one embodiment, the binding of the identities may communicate to other network participants, e.g., NAD 108, authentication node 112, network administrator, etc., that the host partition 404 and the AMT 408 co-reside on the end node 400. This may, in turn, facilitate assignment and enforcement of the platform policy received from the authentication node 112.

The trust agent 448 may cooperate with the ME agent 416 over the dedicated channel 424 to collect posture information on the host partition 404. The host posture information may be attested through the posture attestor 452. In some embodiments, posture information may be attested through cryptographic signing mechanisms. This posture information may then be registered with the authentication node 112 (512).

The AMT 408 may then receive a platform policy from the authentication node 112, more particularly, from the PDP 128. The policy applicator 456 may then verify the policy and implement it on the host partition 404 (516).

Figure 6:
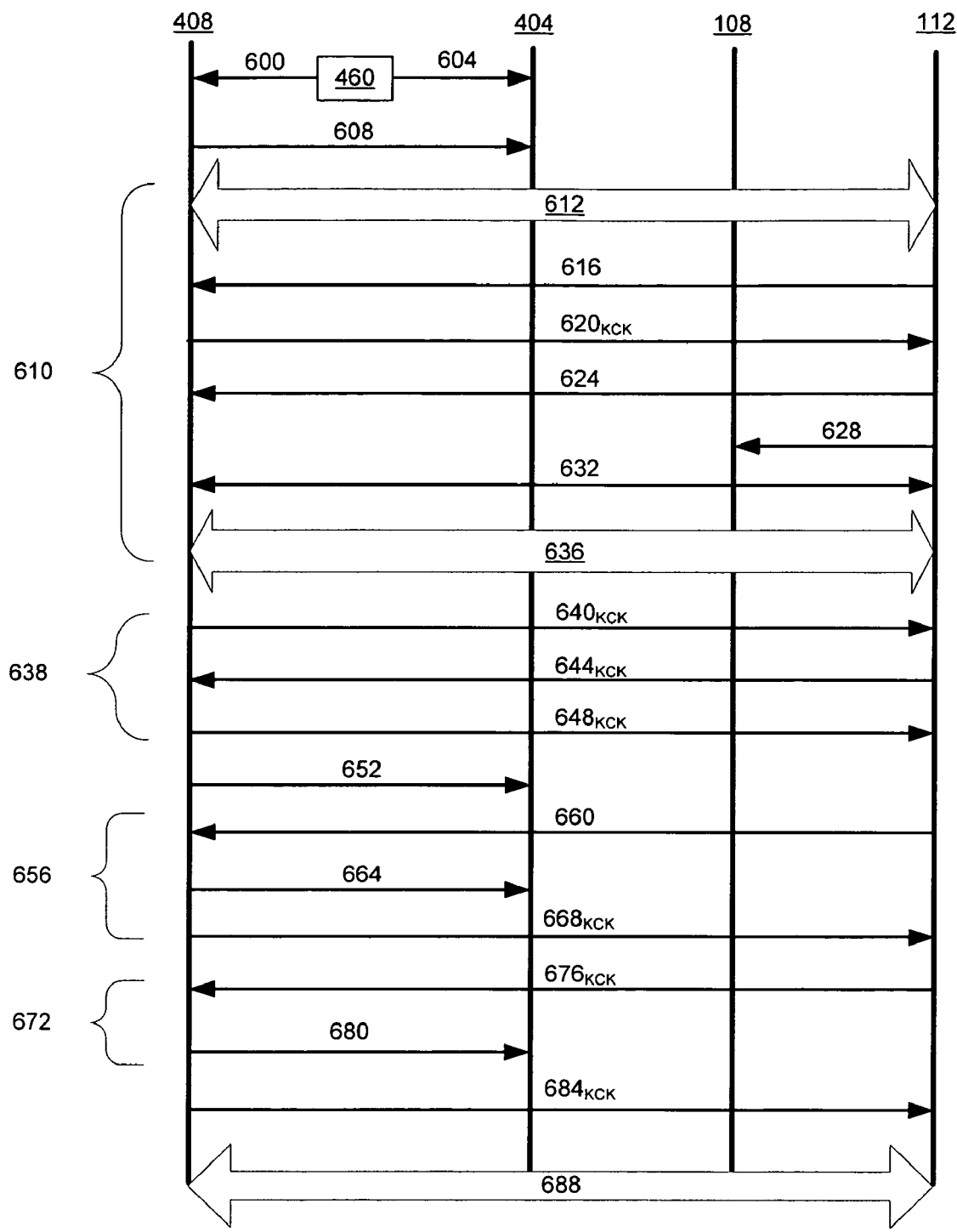
FIG. 6 illustrates a policy negotiation between network entities in accordance with an embodiment of the present invention.

FIG. 6 illustrates a more detailed policy negotiation in accordance with an embodiment of the present invention. In this embodiment, at initiation the host partition 404 and the AMT 408 may establish a root of trust by having the trusted platform module 460 sign certificate (Cert-AMT) 600 and certificate (Cert-H) 604 for the AMT 408 and the host partition 404, respectively. These certificates may be used to ensure that both the host partition 404 and the AMT 408 co-reside on the same platform. These certificates may be signed by one or more of the following parties: original equipment manufacturer (OEM), enterprise information technology (IT) department, platform vendor, or other trusted party.

In an embodiment, the AMT 408 may initially transmit a message 608 to block the driver 432 of the host partition 404 from initiating connections with the NAD 108 pending registration and authentication operations of the AMT 408.

In accordance with an embodiment of the present invention, the AMT 408 and authentication node 112 may perform a mutual authentication and registration exchange 610. The AMT 408, using Cert-AMT, may perform a mutual authentication exchange 612 with the authentication node 112, using Cert-AN. This mutual authentication exchange 612 may result in a shared secret between the AMT 408 and the authentication node 112 that may be referred to as a master secret key (MSK). The MSK may be used to derive a tunnel session key (TSK) and/or a key confirmation key (KCK). In various embodiments, the TSK and/or KCK may be used to facilitate protection of the communication channel between the AMT 408 and the authentication node 112 for payload integrity verification, confidentiality, and prevention of replay attacks.

In an embodiment, the authentication node 112 may send message 616 to query the AMT 408 for posture information. The AMT 408 may transmit its posture information in a message $620_{KCK}$ that may be protected with a message authentication code computed under the KCK. The authentication node 112 may use its KCK to verify the integrity of the AMT 408 posture communication and, if verified, transmit acceptance message 624. Protection of a message with a message authentication code computed under KCK may be represented by the KCK subscript. Subsequent verification of a KCK protected message at the receiving entity through use of the receiving entity's KCK may be assumed unless otherwise stated. This symmetric key authentication may be used to reduce the computational burden on the AMT 408, which may have a constrained processor. However, other embodiments may use other types of authentication.

In an embodiment, the authentication node 112 may use its MSK to derive a pairwise master key (PMK), which it may subsequently provide to the NAD 108 in message 628 to be used to control the AMT 408 access to the network 100. The AMT 408, which may use its MSK to derive the PMK, may communicate the PMK to the NAD 108 to gain access to the network 100. If the NAD 108 determines that the PMK provided by the authentication node 112 matches the PMK provided by the AMT 408 it may allow the AMT 408 access.

The AMT 408 may complete its link authentication procedures and derive appropriate link layer keys with the link network peer 632. As a result of the above operations, a posture authenticated AMT 408 may have access to the network 100 as a trusted entity 636.

The authenticated AMT 408 and the authentication node 112 may participate in the identity binding exchange 638 to bind the host partition 404 with the AMT 408. After the AMT has collected a list of the host identities on the platform for which it will be reporting posture on, e.g., a host-id list, the AMT 408 may communicate the host-id list in a message $640_{KCK}$ to the authentication node 112. In an embodiment, the host-id list may include MAC addresses of the hosts.

Figure 7:
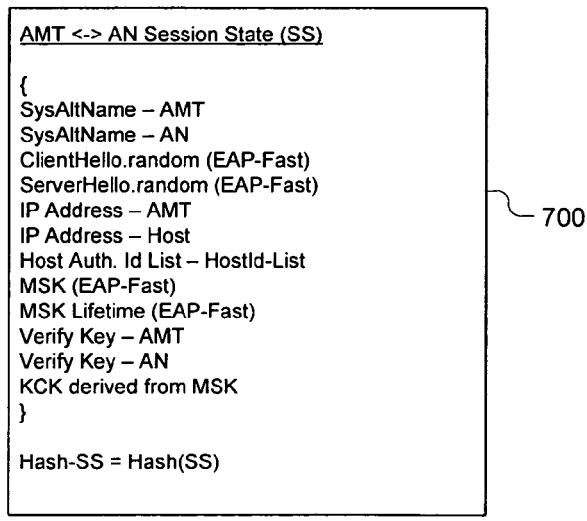
FIG. 7 illustrates a session-state data structure in accordance with an embodiment of the present invention.

In an embodiment, message $640_{KCK}$ may also include a Hash-SS. The Hash-SS may be used as session identifier in the negotiation to provide information relating to a present state of a session-state data structure of the AMT 408. The authentication node 112 may use this information to fill in corresponding fields of its session-state data structure. FIG. 7 illustrates a session-state data structure 700 that may be used in embodiments of the present invention.

In an embodiment, the message $640_{KCK}$ may also include a liveness marker, e.g., a random value (Nonce-AMT). The Nonce-AMT may be an unpredictable, random value generated by the AMT 408 using a hardware and/or software random number generator. The use of nonces to facilitate liveness check will be described in further detail below.

In an embodiment, the message $640_{KCK}$ may also include a MAC address of the AMT (MAC-AMT). The MAC-AMT may include an Internet Protocol (IP) address assigned by a network dynamic host configuration process (DHCP) server.

In response to message $640_{KCK}$, the authentication node may communicate a message $644_{KCK}$ including, e.g., a MAC address of the authentication node 112 (MAC-AN), a Hash-SS, Nonce-ME, and/or a liveness marker generated by the authentication node 112 (Nonce-AN). The AMT 408 may verify KCK integrity of $644_{KCK}$ and liveness and transmit message $648_{KCK}$ communicating Hash-SS and Nonce-AN.

The generation, transmission, and repetition of the Nonce values of this identity binding 508 may provide a bi-party proof-of-liveness check. For example, repetition of Nonce-AMT in the message $644_{KCK}$ may show that the message $644_{KCK}$ was generated after receiving message $640_{KCK}$.

Following the binding of the identities, the AMT 408 may send message 652 to the driver 432 to initiate connection with NAD 108 so that the host partition 404 may acquire an IP address from the network DHCP server.

In an embodiment, following the identity binding exchange 638, the entities may engage in a posture registration exchange 656. The authentication node 112 may transmit a liveness marker, e.g., a second generated nonce value (Nonce-AN2) in a message 660. The AMT 408 may send a message 664 to the host partition 404 requesting posture information (Host-Posture). The AMT 408 may then transmit message $668_{KCK}$ to authentication node 112 including, e.g., Hash-SS, Host-posture, Nonce-AN2, and another nonce value (Nonce-AMT2). The authentication node 112 may verify the integrity and liveness of the message $668_{KCK}$ and transition into a policy exchange 672 by transmitting message $676_{KCK}$, which may include hash-SS, an access policy for the host partition 404 (Host-Policy), and/or Nonce-AMT2.

The AMT 408 may verify the integrity and liveness of the message $676_{KCK}$ and proceed to transmit a message 680 to implement the Host-policy on the end node 400 through the policy applicator 440. The AMT 408 may transmit a confirmation message $684_{KCK}$ to indicate that the policies were applied correctly. The confirmation message $684_{KCK}$ may include a Hash-SS, an indication of the status of the policy on the platform (e.g., Policy-Install-OK), a hash of which policies were applied (e.g., Hash-Host-Policy), and/or another liveness marker (Nonce-AMT3). As a result of the above-described exchanges, the platform end point access control verification may complete 688.

While FIG. 6 illustrates a policy negotiation include the sequential transmission and reception of messages having defined content, other embodiments may have policy negotiations including additional/alternative sequences and/or content.

Although the network nodes are shown and described above as having several separate functional elements, one or more of the functional elements may be combined with other elements and may be implemented by combinations of various hardware and logic circuitry for performing at least the functions described herein. For example, processing element, such as the dedicated processor 216 of the end node 200, may comprise an implementing processor packaged in the network interface card 228.

Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:

1. An end node comprising:
   a network interface having a first media access control (MAC) layer with a first MAC address, and a second MAC layer with a second MAC address;
   a trusted platform module;
   a host partition residing within the end node, having a host partition certificate indicative of a host partition identity, and configured to be signed by the trusted platform module, the host partition being communicatively coupled to the first MAC layer of the network interface to access a network; and
   a management partition residing within the end node, separate and distinct from the host partition, having a management partition certificate indicative of a management partition identity, and configured to be signed by the trusted platform module, the management partition being communicatively coupled to the second MAC layer of the network interface to access the network;
   wherein the host partition certificate signed by the trusted platform module and the management partition certificate signed by the trusted platform module establishes a root of trust between the host partition and the management partition, and the management partition is configured to
   operate independently regardless of whether an operating system of the host partition is operating,
   block the host partition from accessing the network prior to registration and authentication of the management partition with an authentication node coupled to the network,
   bind the host partition identity with the management partition identity by communicating to the authentication node the first MAC address of the host partition to establish the management partition and the host partition's co-residency within the end node,
   negotiate with the authentication node to procure a network access policy from the authentication node for the host partition, and
   implement the network access policy on the host partition upon procurement of the network access policy from the authentication node.

2. The end node of claim 1, wherein the management partition comprises:
   a session state data structure having values for one or more fields selected from the group of fields consisting of an address of the first MAC layer, an address of the second MAC layer, an Internet Protocol (IP) address of the host partition, an IP address of the management partition, a liveness marker, a master secret key (MSK), a lifetime of the MSK, and a key confirmation key (KCK).

3. The end node of claim 1, wherein the management partition comprises:
   a trust agent configured to collect posture information of the host partition.

4. The end node of claim 3, wherein the management partition comprises:
   a posture attestor, coupled to the trust agent, configured to attest to the collected posture information to the authentication node.

5. The end node of claim 1, wherein the management partition comprises:
   a policy applicator configured to receive a policy from the authentication node and configured to implement the policy on the end node.

6. The end node of claim 1, wherein the management partition is a partition selected from the group consisting of an active management technology partition, a manageability engine partition, and a platform resource layer partition.

7. The end node of claim 1, wherein the management partition is further configured to block the host partition from accessing the network by transmission of a message to the host partition to block the host partition from initiation of connections with the authentication node.

8. A method comprising:
   blocking, by a management partition, a host partition residing within an end node from accessing a network prior to registration and authentication of a management partition with an authentication node coupled to the network, wherein the management partition resides within the end node, being separate and distinct from the host partition, and configured to operate independently regardless of whether an operating system of the host partition is operating, wherein a root of trust is established between the management partition and the host partition by having corresponding management partition certificate and host partition certificate signed by a trusted platform module of the end node, wherein the end node comprises a network interface having a first media access control (MAC) layer with a first MAC address, and a second MAC layer with a second MAC address, with the host partition being communicatively coupled to the first MAC layer of the network interface to access the network, and the management partition being communicatively coupled to the second MAC layer of the network interface to access the network; and engaging in policy negotiation on behalf of the host partition, by the management partition, with the authentication node;

wherein said engaging in policy negotiation includes:

performing mutual authentication and registration exchange with the authentication node;

binding a host partition identity of the host partition with a management partition identity of the management partition by communicating to the authentication node the first MAC media access control (MAC) address of the host partition to establish the management partition and the host partition's co-residency within the end node;

negotiating with the authentication node to procure a network access policy from the authentication node for the host partition; and implementing the network access policy on the host partition upon procurement of the network access policy from the authentication node.

9. The method of claim 8, further comprising:

collecting, by the management partition, posture information of the host partition; and transmitting, by the management partition, said collected posture information to the authentication node in the policy negotiation.

10. The method of claim 8, further comprising:

transmitting, by the management partition, a plurality of messages to the authentication node in the policy negotiation; and providing, by the management partition, a liveness marker in at least one of the plurality of messages.

11. The method of claim 8, further comprising:

receiving, by the management partition, a plurality of messages from the authentication node in the policy negotiation; and checking, by the management partition, for liveness in at least one of the plurality of messages.

12. The method of claim 8, further comprising:

authenticating, by the management partition, the identity of the management partition with the authentication node in the policy negotiation;

generating a master secret key, by the management partition, based at least in part on said authenticating the identity of the management partition; and deriving a key confirmation key by the management partition, based at least in part on the master secret key.

13. The method of claim 12, further comprising:

encoding, by the management partition, one or more messages for transmission to the authentication node in the policy negotiation, based at least in part on the key confirmation key; and decoding, by the management partition, one or more messages from the authentication node in the policy negotiation by the management partition, based at least in part on the key confirmation key.

14. The method of claim 8, further comprising:

the management partition authenticating or verifying the management partition with the authentication node in the policy negotiation; and the management partition authenticating or verifying the host partition with the authentication node in the policy node in the policy negotiation after said authenticating or verifying of the management partition.

15. The method of claim 8, wherein blocking the host partition from accessing the network comprises sending, by the management partition, a message to the host partition to block the host partition from initiating connections with the authentication node.

16. An article comprising:

a tangible, non-transitory storage medium;

instructions stored in the storage medium, which, in response to execution of the instructions by a processor associated with a management partition of an end node, cause the management partition to perform operations including:

operating the management partition regardless of whether an operating system of a host partition residing within the end node is operating;

blocking the host partition from accessing a network prior to registration and authentication of the management partition with an authentication node coupled to the network, after a root of trust has been established between the management partition and the host partition by having corresponding management partition certificate and host partition certificate signed by a trusted platform module of the end node, wherein the end node comprises a network interface having a first media access control (MAC) layer with a first MAC address, and a second MAC layer with a second MAC address, with the host partition being communicatively coupled to the first MAC layer of the network interface to access the network, and the management partition being communicatively coupled to the second MAC layer of the network interface to access the network;

binding an identity of the host partition with an identity of the management partition by communicating to the authentication node the first MAC media access control (MAC) address of the host partition to establish the management partition and the host partition's co-residency within the end node;

negotiating with the authentication node to procure a network access policy from the authentication node for the host partition; and implementing the network access policy on the host partition upon procurement of the network access policy from the authentication node.

17. The article of claim 16, wherein the operations further comprise:

collecting posture information of the host partition; and transmitting said collected posture information to the authentication node in the policy negotiation.

18. The article of claim 16, wherein the operations further comprise:

transmitting a plurality of messages to the authentication node in the policy negotiation; and providing a liveness marker in at least one of the plurality of messages.

19. The article of claim 16, wherein the operations further comprise:

receiving a plurality of messages from the authentication node in the policy negotiation; and checking for liveness in at least one of the plurality of messages.

20. A system comprising:

a wireless network interface equipped to operate a first media access control (MAC) layer having a first MAC address and a second MAC layer having a second MAC address;

a trusted platform module;

a host partition having a host partition certificate indicative of a host partition identity and configured to be signed by the trusted platform module, wherein the host partition is configured to be communicatively coupled to the wireless network interface to access a network via the first MAC layer;

a management partition having a management partition certificate indicative of a management partition identity and configured to be signed by the trusted platform module, wherein the host partition certificate signed by the trusted platform module and the management partition certificate signed by the trusted platform module establishes a root of trust between the host partition and the management partition, wherein the management partition is configured to be communicatively coupled to the wireless network interface to access the network via the second MAC layer, and wherein the management partition is further configured to:

operate regardless whether the host partition is operating, block the host partition from accessing the network prior to registration and authentication of the management partition with an authentication node coupled to the network, bind the host partition identity with the management partition identity by communicating to the authentication node the first MAC address of the host partition to establish the management partition and the host partition's co-residency within the system, negotiate with the authentication node to procure a network access polity policy from the authentication node for the host partition, and implement the network access policy on the host partition upon procurement of the network access policy from the authentication node; and one or more omnidirectional antennas coupled to the wireless network interface configured to provide access to the network.

21. The system of claim 20, wherein the management partition comprises:

a trust agent coupled to the host partition configured to collect posture information of the host partition.

22. The system of claim 21, wherein the management partition comprises:

a posture attestor, coupled to the trust agent, configured to attest to the collected posture information to the authentication node.

23. The system of claim 20, wherein the management partition comprises:

a policy applicator configured to receive a network access policy from the authentication node and configured to implement the network access policy on the host partition.

* * * * *

UNITED STATES PATENT AND TRADEMARK OFFICE
CERTIFICATE OF CORRECTION

| | |
|---|---|
| PATENT NO. | : 8,099,495 B2 |
| APPLICATION NO. | : 11/323333 |
| DATED | : January 17, 2012 |
| INVENTOR(S) | : Kapil Sood et al. |

Page 1 of 1

It is certified that error appears in the above-identified patent and that said Letters Patent is hereby corrected as shown below:

In the Claims

Column 14

Line 4, Claim 20, "access polity…" should read -- access policy… --.

Signed and Sealed this
Twenty-seventh Day of August, 2013

Teresa Stanek Rea
*Acting Director of the United States Patent and Trademark Office*